UNITED STATES PATENT OFFICE 2,555,973

HALOGENATED DERIVATIVES OF THE NAPHTHOQUINONE - IMINE SERIES AND A PROCESS OF MAKING SAME

Valentin Kartaschoff and Ernst Merian, Basel, Switzerland, assignors to Sandoz A. G., Basel, Switzerland, a Swiss firm No Drawing. Application June 6, 1949, Serial No. 97,488. In Switzerland June 10, 1948

8 Claims. (Cl. 260—396)

It has been found that new halogenated derivatives of the naphthoquinone-imine series can be prepared by treating compounds of the general formula

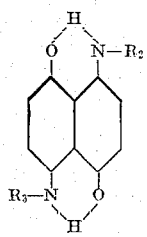

wherein $R_2$ stands for a member selected from the group consisting of hydrogen, alkyl, cycloalkyl, aryl and heterocyclic radicals and $R_3$ means a member selected from the group consisting of alkyl, cycloalkyl, aryl and heterocyclic radicals, with halogenating agents.

The formulae used in the present specification show that the two nitrogen containing groups in position 1 and 5 of the naphthalene nucleus do in fact not possess a different chemical reactibility. As a matter of fact the so-called naphthazarine intermediate which is also known in the literature as 5-amino-8-hydroxy-1,4-naphthoquinone-imine (1) may preferably be written in the following manner:

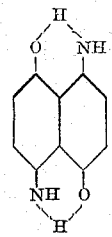

This formula shows that the two nitrogen containing groups are absolutely identical, which can be proved by the fact that the said compound reacts neither as amine nor as naphthol nor as quinone. As up to now there exists no nomenclature for this improved formula we will use in the present specification the conventional expressions such as for instance "5-amino-8-hydroxy-1,4-naphthoquinone-imine-(1)."

The starting products used according to the present process can be prepared by condensing 5-amino-8-hydroxy-1,4-naphthoquinone-imine-(1) with aliphatic, cyclo-aliphatic or aromatic amines according to the methods which are described for example in the United States Patents Nos. 647,370; 668,445; 1,759,273; 2,066,119; 2,135,366 and 2,399,355.

The amines used for the condensation are aliphatic amines like methylamine, dimethylamine, mono- and diethanolamine, propanolamine, butanolamine, aminopropanediol, diaminopropanol and so on; cycloaliphatic amines like hexahydroaniline, hexahydrotoluidine, hexahydroxylidine, hexahydromesidine, 1- and 2-amino-1,2,3,4- or 5,6,7,8-tetrahydronaphthalene and so on; aromatic amines like aniline, chloraniline, toluidine, xylidine, mesidine, alkoxyaniline, nitroaniline, naphthylamine, amidophenols and their halogen and/or nitro derivatives, amidonaphthols, phenylene- and naphthylene-diamines, diaminodiphenyls and the like, as well as heterocyclic compounds containing an amino group which is capable of condensation with the said napththoquinone-imine, like 1-phenyl-3-amino-5-pyrazolone.

According to the condensation conditions and stoichiometric relations of the compounds used for condensation the starting products cited above can react with one, two or three amino radicals.

The halogenation of the starting products prepared in this manner is carried out preferably in presence of a solvent or diluting agent, like sulfuric acid, glacial acetic acid, nitrobenzene, and possibly in presence of acid binding agents and under irradiation with ultraviolet light. According to the quantity of the halogenating agent and the mode of operation mono- or polyhalogenated derivatives will be obtained.

The compounds obtained in this manner possess varying constitutions according to the selected starting products. If condensation products containing aliphatic, cycloaliphatic or heterocyclic radicals are used, derivatives having halogen atoms in the naphthalene nucleus will be obtained. If starting compounds containing aromatic radicals are used, it is supposed that the halogenation takes place first in the said aromatic radicals and probably only later on in the naphthoquinone-imine radical itself.

The new halogenated derivatives of the naphthoquinone-imine series prepared in the manner described above are water-insoluble compounds, but soluble in organic solvents with a violet, blue, green or grey coloration. They can be used for dyeing plastics and artificial fibres, like acetate silk and nylon.

The compounds possessing a good affinity for acetate silk show, as compared with the starting products, a very good fastness to gas-fading.

The following examples serve further to illustrate and explain the invention, without limiting it however. Parts are by weight and temperatures are in degrees centigrade.

Example 1

323 parts of the dyestuff prepared from equimolecular quantities of para-phenetidine and 5-amino - 8 - hydroxy - 1,4 - naphthoquinone-imine-(1) and 200 parts of anhydrous sodium acetate are suspended in 5000 parts of glacial acetic acid and treated at 80° and under good stirring with 160 parts of bromine. The bromination goes very quickly. After cooling down the reaction product is diluted with water, whereupon the blue-green dyestuff, which precipitates, is filtered off, washed free from acid and dried. It dyes acetate silk in greenish-blue shades of an excellent fastness to light and gas-fading.

As compared to the starting product that dissolves in ethanol with a greenish-blue coloration and shows the absorption spectrum maxima $m\mu$ 609 and 561, the new product is soluble in ethanol with a bluish green coloration and does not show the above mentioned absorption maxima. The color of the solution in sulfuric acid changes from reddish-blue to blue and in sulfuric acid and formaldehyde from blue to blue-green.

Instead of the condensation product used above, other condensation products with amines, like o- and p-anisidine, o-phenetidine, p-aminophenylether, p-aminophenolbenzylether and so on, can be used. These products have similar qualities.

Example 2

25.5 parts of the condensation product from equimolecular quantities of 5-amino-8-hydroxy-1,4-naphthoquinone-imine-(1) and aniline are heated to 80° under good stirring in 200 parts of glacial acetic acid and 15 parts of anhydrous sodium acetate and treated at the said temperature with 18.5 parts of bromine. After half an hour, the reaction mixture is poured into 1000 parts of water, filtered and washed. The residue that consists merely from a monobromo derivative of the anilide of the so-called naphthazarine intermediate is soluble in ethanol, like the starting product, with a pure blue coloration and shows the absorption maxima $m\mu$ 610 and 563. The solution in concentrated sulfuric acid changes, as compared to the starting product, from yellow-green to blue-green and becomes blue on addition of paraformaldehyde.

Example 3

25.5 parts of the condensation product used in Example 2 are suspended in 200 parts of glacial acetic acid in presence of 20 parts of anhydrous sodium acetate and treated under good stirring at 10° with 15.5 parts of sulfuryl chloride. By cooling with ice-water, care is taken that the reaction temperature always is kept under 15°. After stirring for one hour, the reaction mixture is poured into 1000 parts of water, the precipitate filtered and washed. The new monochloro-derivative is soluble in ethanol with a blue coloration and shows the absorption maxima $m\mu$ 610 and 563. The solution in concentrated sulfuric acid has a dull green color, but becomes, on addition of paraformaldehyde, pure blue.

Example 4

45 parts of fine powdered 5-amino-8-hydroxy-1,4-naphthoquinone-imine-(1) are heated in 350 parts of glacial acetic acid up to the boiling point. At this temperature 22 parts of p-aminophenol are added and stirred for ¾ hour until the condensation has completed. The whole mass is now cooled to 20° and 35 parts of sulfuryl chloride are introduced. After 1 hour the temperature is raised to 50° and then the reaction mixture is poured into 3000 parts of water, filtered, washed and dried. The new product is a dark powder, which is soluble in ethanol with a bluish green coloration. The solution in concentrated sulfuric acid is greenish yellow. It is a monochloro-derivative of the p-hydroxy-anilide of the so-called naphthazarine intermediate.

If an aliquot quantity of bromine is used instead of sulfuryl chloride and the reaction temperature kept at 70°, the corresponding monobromo derivative is obtained.

Both the new products have good affinity for acetate silk and nylon and yield bluish-green shades on the said fibres.

Example 5

26 parts of the condensation product from 5-amino - 8 - hydroxy - 1,4 - naphthoquinone-imine-(1) and n-amylamine are well stirred up in 200 parts of glacial acetic acid and treated with 16 parts of bromine at 65° in presence of 20 parts of sodium acetate. After one hour the whole reaction mass is poured into 1000 parts of water. The residue is a monobromo derivative of the said condensation product. It is soluble in ethanol with a clear blue and in sulfuric acid with a yellowish-brown coloration. The latter turns to green after addition of formaldehyde.

Similar products are obtained if condensation products of other aliphatic amines are used, for instance those with aminoalcohols, like aminoethanol, which have a more greenish coloration if dissolved in ethanol.

Example 6

13.5 parts of the condensation product from 5 - amino - 8 - hydroxy - 1,4 - naphthoquinone-imine-(1) and cyclohexylamine are stirred up in 200 parts of glacial acetic acid and are treated at 75° with 16 parts of bromine in presence of 20 parts of sodium acetate. The reaction product is worked up in the same manner as described in Example 4. It consists merely of a dibromo hexahydroanilide of the so-called naphthazarine intermediate. It is soluble with a reddish brown coloration in concentrated sulfuric acid and insoluble in ethanol.

Example 7

5 parts of the condensation product from equimolecular quantities of 5-amino-8-hydroxy-1,4-naphthoquinone-imine-(1) and 1-phenyl-3-amino-5-pyrazolone are stirred up in 200 parts of glacial acetic acid at 65° and halogenated at the same temperature by means of 4.8 parts of bromine. As acid binding agent 5 parts of sodium acetate are used. After diluting with water, the product is isolated in the manner described in the other examples. The new compound is a di-bromo-derivative of the starting product and is soluble with a greenish blue coloration in ethanol and with a brown coloration in concentrated sulfuric acid. The latter turns greenish grey after addition of formaldehyde.

What we claim is:

1. A process for the manufacture of a halogenated naphthoquinone-imine comprising the step of treating a naphthoquinone-imine of the general formula

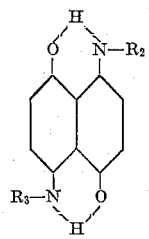

wherein $R_2$ stands for a member selected from the group consisting of hydrogen, alkyl, cycloalkyl, aryl and heterocyclic radicals and $R_3$ means a member selected from the group consisting of alkyl, cycloalkyl, aryl and heterocyclic radicals, with a halogenating agent selected from the group consisting of bromine and sulfuryl chloride.

2. A process for the manufacture of 3'-chloro-4'-hydroxy-5-anilido-8-hydroxy-1,4-naphthoquinone-1-imine, comprising the step of treating 4'-hydroxy-5-anilido-8-hydroxy-1,4-naphthoquinone-1-imine with sulfuryl chloride.

3. A process for the manufacture of 3'-bromo-4'-hydroxy-5-anilido-8-hydroxy-1,4-naphthoquinone-1-imine, comprising the step of treating 4'-hydroxy-5-anilido-8-hydroxy-1,4-naphthoquinone-1-imine with bromine.

4. A process for the manufacture of 3'-bromo-4'-ethoxy-5-anilido-8-hydroxy-1,4-naphthoquinone-1-imine, comprising the step of treating 4'-ethoxy-5-anilido-8-hydroxy-1,4-naphthoquinone-1-imine with bromine.

5. The halogenated naphthoquinone-imines of the formula

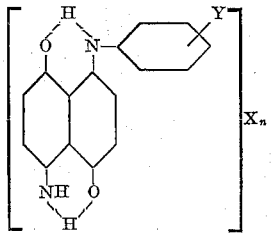

wherein Y stands for a member selected from the group consisting of hydrogen, hydroxy, methoxy, ethoxy, phenoxy, benzyloxy, X represents an atom selected from the group consisting of chlorine and bromine and $n$ is a whole number included in the group consisting of 1 and 2.

6. The halogenated naphthoquinone-imine of the formula

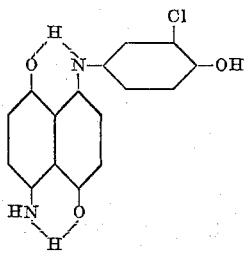

7. The halogenated naphthoquinone-imine of the formula

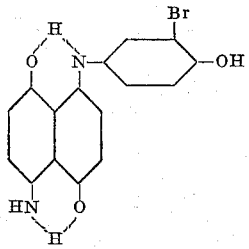

8. The halogenated naphthoquinone-imine of the formula

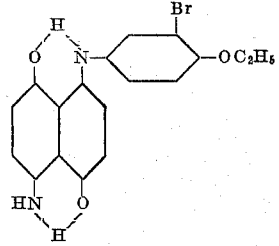

VALENTIN KARTASCHOFF.
ERNST MERIAN.

REFERENCES CITED

The following references are of record in the file of this patent:

FOREIGN PATENTS

| Number | Country | Date |
|---|---|---|
| 77,330 | Germany | Sept. 21, 1894 |
| 438,609 | Great Britain | Nov. 20, 1935 |

OTHER REFERENCES

Lassar-Cohn: Arbeits. Org. Chem. Lab. Special, part pages 251–252 (1923).